(12) United States Patent
Fuks et al.

(10) Patent No.: US 12,379,885 B2
(45) Date of Patent: Aug. 5, 2025

(54) COMPUTERIZED SYSTEMS AND METHODS FOR DYNAMICALLY CONTROLLING INPUTS AND MODIFYING USER INTERFACE ELEMENTS ASSOCIATED WITH A MULTI-SCREEN POS DEVICE

(71) Applicant: COUPANG CORP., Seoul (KR)

(72) Inventors: Pavel Fuks, Seoul (KR); Yimin Sang, Shanghai (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 18/194,830

(22) Filed: Apr. 3, 2023

(65) Prior Publication Data

US 2024/0329907 A1 Oct. 3, 2024

(51) Int. Cl.
*G06F 3/14* (2006.01)
*G06F 3/04886* (2022.01)

(52) U.S. Cl.
CPC ........ *G06F 3/1423* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 9,946,506 B2 * | 4/2018 | Ting | G06F 3/005 |
| D872,171 S * | 1/2020 | Luo | D18/4.1 |
| 10,733,588 B1 * | 8/2020 | Mocko | G06F 9/454 |
| 10,949,846 B2 * | 3/2021 | Sanchez-Llorens | G06Q 20/3567 |
| 11,069,202 B2 * | 7/2021 | Nishio | H05K 5/0204 |
| 11,080,674 B1 * | 8/2021 | Chen | G06K 19/07703 |
| 11,080,675 B1 * | 8/2021 | Guise | G06Q 20/206 |
| 11,354,630 B1 * | 6/2022 | Han | G06Q 20/326 |
| 2009/0198582 A1 * | 8/2009 | Tokorotani | G06Q 20/208 705/17 |

(Continued)

FOREIGN PATENT DOCUMENTS

| | | |
|---|---|---|
| CN | 110708426 A | 1/2020 |
| CN | 210072832 U | 2/2020 |
| JP | 2017-519321 A | 7/2017 |

OTHER PUBLICATIONS

International Search Report and Written Opinion of the International Search Authority in counterpart International Application No. PCT/IB2023/054895 dated Dec. 21, 2023 (10 pages).

(Continued)

*Primary Examiner* — Benyam Ketema
(74) *Attorney, Agent, or Firm* — FINNEGAN, HENDERSON, FARABOW, GARRETT & DUNNER LLP

(57) ABSTRACT

Computer-implemented systems and methods for dynamically controlling a multi-screen device such as a point-of-sale (POS) device are disclosed and may be configured to receive a first input; in response to receiving the first input, enable a first input mode by replacing one or more first input elements with one or more second input elements for display on at least one of a first touch display or a second touch display; receive a second input associated with at least one of the first touch display or the second touch display; determine whether the first input mode is enabled; and based on determining whether the first input mode is enabled, deny the second input.

20 Claims, 7 Drawing Sheets

(56) References Cited

U.S. PATENT DOCUMENTS

| | | | | |
|---|---|---|---|---|
| 2011/0176004 | A1* | 7/2011 | Chaussade | G07F 17/32 |
| | | | | 348/150 |
| 2014/0249950 | A1* | 9/2014 | Fukuda | G07G 1/0045 |
| | | | | 705/23 |
| 2015/0220899 | A1* | 8/2015 | Namura | G06Q 20/387 |
| | | | | 705/17 |
| 2016/0140095 | A1* | 5/2016 | Park | G06F 40/169 |
| | | | | 707/736 |
| 2017/0185363 | A1* | 6/2017 | Ting | G06F 1/1626 |
| 2017/0345263 | A1* | 11/2017 | Gotanda | G07G 5/00 |
| 2018/0075709 | A1* | 3/2018 | Watanabe | G07G 1/12 |
| 2018/0095588 | A1* | 4/2018 | Klein | H04L 9/3231 |
| 2018/0240309 | A1* | 8/2018 | Watanabe | G07F 7/025 |
| 2018/0276639 | A1* | 9/2018 | Gotanda | G06Q 20/208 |
| 2019/0005476 | A1* | 1/2019 | Luo | G06F 1/1601 |
| 2019/0272713 | A1* | 9/2019 | Iizaka | G07G 1/0045 |
| 2019/0279470 | A1* | 9/2019 | Nishio | G07G 1/00 |
| 2020/0184443 | A1 | 6/2020 | Bell et al. | |
| 2021/0125178 | A1* | 4/2021 | James | H04W 12/0471 |
| 2022/0067724 | A1* | 3/2022 | James | H04W 12/50 |

OTHER PUBLICATIONS

Rejection Decision in counterpart Taiwanese Application No. 112116502 dated Oct. 4, 2024 (13 pages).

Office Action of the Korean Patent Office in counterpart Korean Patent Application No. 10-2023-0054036 dated Apr. 17, 2025 (15 pages).

Notice of Allowance of the Taiwanese Patent Office in counterpart Taiwanese Application No. 112116502 dated Apr. 8, 2025 (2 pages).

* cited by examiner

FIG. 4C

COMPUTERIZED SYSTEMS AND METHODS FOR DYNAMICALLY CONTROLLING INPUTS AND MODIFYING USER INTERFACE ELEMENTS ASSOCIATED WITH A MULTI-SCREEN POS DEVICE

TECHNICAL FIELD

The present disclosure generally relates to computerized systems and methods for dynamically controlling inputs and modifying user interface elements associated with a multi-screen device such as a point-of-sale (POS) device. In particular, some embodiments of the present disclosure relate to inventive and unconventional systems for dynamically replacing continuous input elements with discrete input elements based on inputs received by a multi-screen POS device, resulting in a system capable of processing inputs received from multiple touch screens being used at the same time using only a single computer.

BACKGROUND

Point-of-sale (POS) technology enables customers to place orders and enables merchants to accept orders. For example, a POS device may display several options that may be selectable via touch inputs and/or inputs received from one or more input/output (I/O) devices, such as a keyboard or pointing device, connected to the POS device. On the customer side, a POS device may display several items that the customer can select from and may further present payment options and steps for completing a transaction. On the merchant side, a POS device may display similar options to that of the customer side, but may also include options for accepting and denying online orders, such as pick-up and delivery orders, and editing current orders.

Conventional POS devices may be in the form of a kiosk or a tablet, wherein the former may allow for separating a customer zone from a merchant zone, and the latter may allow for using only a single computing device to perform both customer and merchant functions. However, kiosks are often implemented as standalone devices that require using separate computers for customers and merchants, which can raise costs, require more computational resources, and necessitate internetworking or other communication systems to allow the customer POS device to communicate with the merchant POS device. Tablets, while they may require less computational resources than systems that use kiosks, may reduce an efficiency as customer and merchant functions are asynchronously performed on a single display. Therefore, when customer functions are being performed on the display, such as to make a payment, the merchant cannot perform other merchant functions, such as accepting delivery orders, unless there is another computer, which cancels out the benefit of using a tablet POS device for reduced computational resources.

A possible solution to such problems is to use a single computer connected to multiple displays, such as a touch screen for the merchant and a touch screen for the customer. However, certain operating systems are incompatible with multiple inputs occurring simultaneously or semi-simultaneously, particularly with input elements that require continuous focus, such as text input fields. For example, with a text input field, focus on the text input field can be lost if an interaction, such as a click or touch, is performed on anywhere other than the text input field. Therefore, if a customer touches the customer touch screen while the merchant is entering text using a virtual or physical keyboard into a text input field displayed on the merchant touch screen, focus on the text input field will be lost and subsequent text entered by the merchant will be fed somewhere other than the text input field.

Therefore, there is a need for improved systems and methods for dynamically controlling inputs and modifying user interface elements associated with a multi-screen device, such as a point-of-sale (POS) device, such that a single computer may successfully process inputs received from multiple touch screens being used at the same time.

SUMMARY

One aspect of the present disclosure is directed to a computer-implemented system comprising one or more memory devices storing instructions, a first touch display configured to receive one or more touch inputs, a second touch display configured to receive one or more touch inputs, and one or more processors, communicatively coupled to the first touch display and the second touch display, configured to execute the instructions to perform a method for dynamically controlling a multi-screen device. The method includes receiving a first input via the first touch display, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input.

Another aspect of the present disclosure is directed to a method for dynamically controlling a multi-screen device. The method includes receiving a first input via the first touch display, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input.

Yet another aspect of the present disclosure is directed to a computer-implemented system comprising one or more memory devices storing instructions, a first touch display configured to receive one or more touch inputs, a second touch display configured to receive one or more touch inputs, and one or more processors, communicatively coupled to the first touch display and the second touch display, configured to execute the instructions to perform a method for dynamically controlling a multi-screen device. The method includes receiving a first input, in response to receiving the first input, enabling a first input mode by replacing one or more continuous input elements with one or more discrete input elements for display on at least one of the first touch display or the second touch display, receiving a second input associated with the second touch display, determining whether the first input mode is enabled, and in response to determining that the first input mode is enabled, denying the second input. The method further includes detecting a trigger event, and in response to detecting the trigger event, disabling the first input mode.

Other systems, methods, and computer-readable media are also discussed herein.

BRIEF DESCRIPTION OF THE DRAWINGS

FIGS. 4B and 4C depict exemplary user interfaces displayed in a point-of-sale (POS) mode, consistent with the disclosed embodiments.

DETAILED DESCRIPTION

Figure 1:
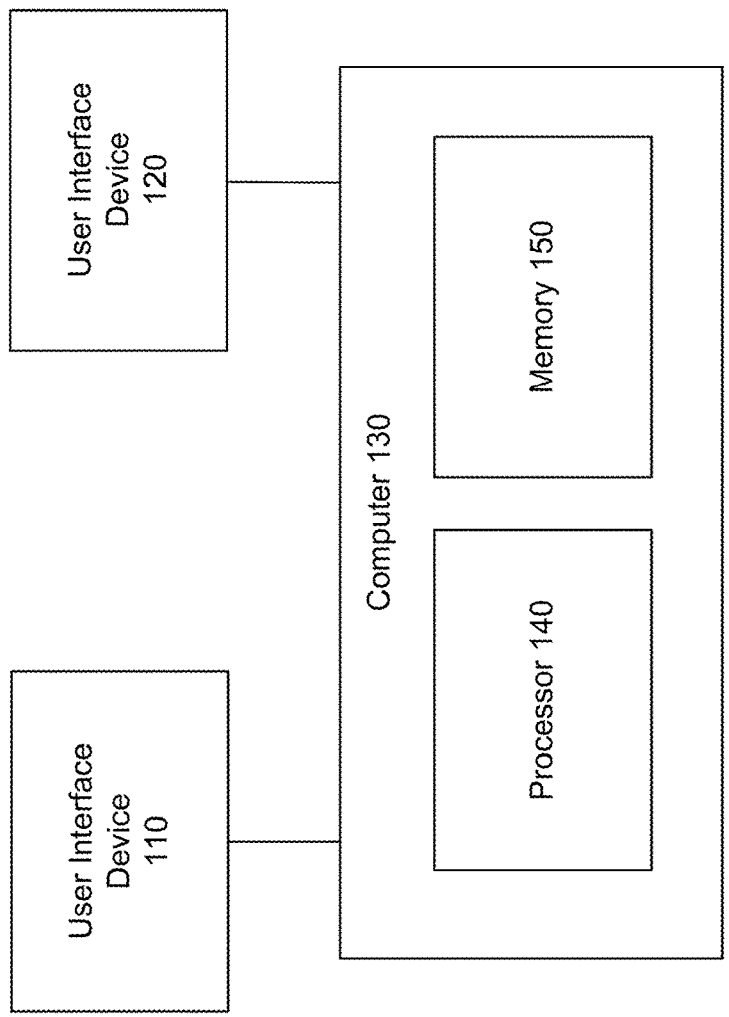
FIG. 1 is a schematic block diagram illustrating an embodiment of a computerized system for dynamically controlling inputs and modifying user interface elements associated with a multi-screen point-of-sale (POS) device, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for dynamically controlling a multi-screen device, such as a POS device, by receiving a first input, and in response to receiving the first input, enabling a first input mode, wherein enabling the first input mode causes the one or more processors to detect one or more first input elements displayed on at least one of the first touch display or the second touch display, generate one or more second input elements, and replace the one or more first input elements with the generated one or more second input elements for display on at least one of the first touch display or the second touch display. The method further includes receiving a second input associated with at least one of the first touch display or the second touch display, determining whether the first input mode is enabled, and based on determining whether the first input mode is enabled, denying the second input. The disclosed embodiments provide innovative technical features that allow for implementation of a multi-screen device using a single computer, wherein the multi-screen device is configured to process inputs received from at least two touch screens, and wherein the at least two touch screens are being used at the same time. For example, disclosed embodiments enable efficient usage of computational resources, enables simultaneous usage of multiple touch screens connected to a single computer, enable transitions between input modes based on detected trigger events, enable dynamic detection and replacement of continuous input elements presented on user interfaces with discrete input elements, and enable acceptance and denial of certain inputs based on a determined current input mode.

FIG. 1 is a schematic block diagram illustrating components of an exemplary system 100, consistent with disclosed embodiments. In some embodiments, and as discussed throughout this disclosure, system 100 is a POS (point-of-sale) device, but one of ordinary skill will understand that system 100 has applications outside of a POS environment. As shown in FIG. 1, embodiments of a POS system may include user interface devices 110 and 120, and computer 130 comprising one or more processors 140 and one or more memory devices 150.

User interface devices 110 and 120 may be any input/output (I/O) devices (e.g., touch screen, monitor, touch panel, tablet) configured to receive user inputs. For example, user interface devices 110 and 120 may comprise pressure-sensitive devices. In some embodiments, user interface devices 110 and 120 may be configured to display various user interfaces to one or more users. Additionally, user interface devices 110 and 120 may be configured to receive one or more inputs from one or more users, such as touch inputs and/or inputs received from input/output devices, and may generate one or more outputs in response to the received one or more inputs. In some embodiments, user interface devices 110 and 120 may be configured to display different information, such as one or more different applications. Additionally or alternatively, user interface devices 110 and 120 may be configured to display the same information. In some embodiments, at least one of user interface devices 110 or 120 may include or be connected to various input/output devices, such as a keyboard, pointing device (e.g., a mouse), a camera, a microphone, a gesture sensor, an action sensor, a physical button, etc. In some embodiments, only one of user interface devices 110 and 120 may be connected to a keyboard and/or pointing device. Additionally or alternatively, at least one of user interface devices 110 or 120 may be configured to collect and process video and audio signals. In some embodiments, user interface devices 110 and 120 may include one or more communication modules (not shown) for sending and receiving information from external devices by, for example, establishing wired or wireless connectivity between user interface devices 110 and 120 and a network (not pictured). In some embodiments, system 100 may include more than two user interface devices. In some embodiments, user interface devices 110 and 120 may be comprised within a single user interface device.

Computer 130 may be any computing device (e.g., desktop computer, laptop, server) configured to house one or more processors 140 and one or more memory devices 150, as well as other hardware components. Computer 130 may be configured for wired and/or wireless communications and may include software that when executed by one or more processors 140 performs internet-related communication (e.g., TCP/IP) and content display processes. In some embodiments, computer 130 may include or be connected to various input/output devices, such as a keyboard, pointing device, a camera, a microphone, a gesture sensor, an action sensor, a physical button, etc. In some embodiments, computer 130 may be configured such that inputs received from an input/output device may be displayed on one user interface device but not the other, such as by modifying configuration settings for computer 130. Processor 140 may be any processing unit (e.g., computing device, microcontroller, microprocessor, system-on-chip, digital signal processor) configured to perform operations based on instructions stored in one or more memory devices, such as memory 150. For example, processor 140 may execute applications to communicate with components over a network (not pictured) and display content via user interface devices 110 and 120. Memory 150 may be volatile or non-volatile, magnetic, semiconductor, tape, optical, removable, non-removable, or other type of storage device or tangible computer readable medium, and may store one or more operating systems, such as Microsoft Windows, Unix, Linux, Android, Mac OS, iOS, or other types of operating systems.

In some embodiments, system 100 may be connected to a network (not pictured) configured to provide communications between components internal to system 100 as well as communications with devices external to system 100. For example, the network may be any type of network (including infrastructure) that provides communications, exchanges information, and/or facilitates the exchange of information, such as the Internet, or other suitable connection(s) that enables the sending and receiving of information between devices. In other embodiments, the network may include multiple networks, organizing for example a network of networks. In some embodiments, user interface devices 110 and 120 may be connected but not connected to each other via a network.

Figure 2:
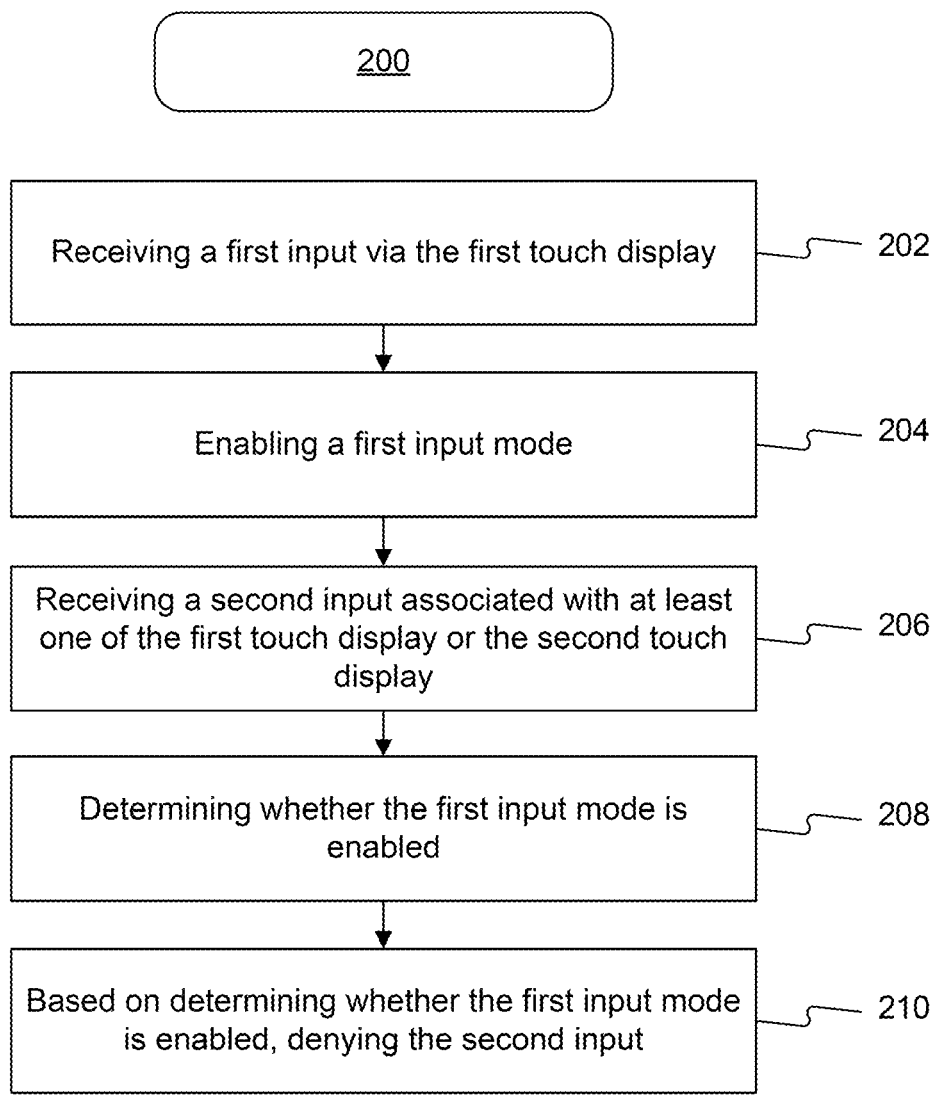
FIG. 2 shows an exemplary method for dynamically controlling inputs and modifying user interface elements associated with a multi-screen point-of-sale (POS) device, consistent with the disclosed embodiments.

FIG. 2 shows an exemplary method 200 for dynamically controlling inputs and modifying user interface elements associated with system 100 which may be implemented as a multi-screen point-of-sale (POS) device. In some embodiments, method 200 or a portion thereof may be performed by one or more processors 140 or one of systems 100, 300a (described in of FIG. 3A description below), or 300b (described in FIG. 3B description below). For example, systems may include a first touch display configured to receive one or more touch inputs, a second touch display configure to receive one or more touch inputs, one or more processors communicatively coupled to the first touch display and the second touch display, and one or more memory devices storing instructions that, when executed by the one or more processors, cause the system to perform the steps shown in FIG. 2. In some embodiments, the first touch display may comprise a customer-side touch display and the second touch display may comprise a merchant-side touch display. Additionally or alternatively, the first touch display and the second touch display may be physically connected to each other (either directly or through another device such as computer 130).

At step 202, one or more processors may be configured to receive a first input via the first touch display. In some embodiments, the first input may comprise a touch input. For example, system 100 may receive a first touch input signal via a first user interface presented on the first touch display. In some embodiments, the first user interface may include various elements selectable via touch and/or via I/O devices (e.g., pointing device, keyboard). For example, system 100 (e.g., at a coffee shop) may present on the first touch display one or more items, such as one or more categories (e.g., hot coffees, iced coffees, teas, seasonal, food, etc.) and/or one or more items within each category (e.g., for hot coffees, americano, cappuccino, espresso, etc.) in the form of selectable user interface elements. Additionally or alternatively, system 100 may present one or more payment options in the form of selectable user interface elements. In some embodiments, the first input may comprise a touch input selecting a user interface element. In some embodiments, the first input may comprise an input selecting a user interface element using an I/O device, such as a pointing device or keyboard. In some embodiments, the first input may comprise a touch input to awaken the screen, such as if the screen has gone to sleep. In some embodiments, the first input may comprise a touch input received on any pressure-sensitive surface of the first touch display, wherein the first touch display may be configured to transmit the input received on any pressure-sensitive surface of the first touch display to the one or more processors for further processing.

In some embodiments, prior to receiving the first input, the one or more processors may be configured to detect a user. For example, the one or more processors may be configured to receive one or more detection signals from one or more sensors (e.g., camera, gesture sensor, action sensor) communicatively coupled and/or physically connected to system 100. In some embodiments, at least one of the one or more sensors may be configured to continuously collect sensor data.

At step 204, the one or more processors may be configured to enable a first input mode. For example, in some embodiments, the one or more processors may enable the first input mode by modifying a bit or other element in memory (e.g., in a data structure) in order to signify that the first input mode is enabled. In other embodiments, the one or more processors may enable the first input mode by modifying the registry of system 100's operating system. For example, the system 100's operating system may be Microsoft Windows, and the one or more processors may automatically modify the Windows registry to enable the first input mode in response to certain events, such as events described below.

In some embodiments, enabling the first input mode may comprise disabling certain inputs or may cause the one or more processors to disable certain inputs. For example, enabling the first input mode may comprise dynamically changing one or more settings to disable inputs received from one or more physical and/or virtual keyboards. In some embodiments, enabling the first input mode may comprise dynamically disabling connection to one or more physical keyboards. A keyboard as discussed in the disclosed embodiments may comprise a physical or virtual mechanism to input letters, numbers and/or characters into a continuous input field, such as into a text input field. For example, a virtual keyboard may be a software keyboard presented on a display and configured for touch inputs. In some embodiments, enabling the first input mode may comprise dynamically changing one or more settings to disable one or more inputs received from one or more pointing devices. For example, one or more inputs received from the one or more pointing devices may comprise movement signals and/or hover signals. In some embodiments, enabling the first input mode may allow scroll signals and/or click signals to be received from the one or more pointing devices. In some embodiments, enabling the first input mode may comprise dynamically disabling connection to the one or more pointing devices. In some embodiments, enabling the first input mode may include using at least one of JavaScript or custom scripts to enable and/or disable certain user interface elements and inputs.

In some embodiments, the one or more processors may be configured to enable the first input mode in response to receiving the first input. In some embodiments, the one or more processors may be configured to enable the first input mode in response to detecting the user. For example, the at least one processor may be configured to enable the first input mode in response to receiving the one or more detection signal from the one or more sensors. In some embodiments, the one or more processors may be configured to enable the first input mode in response to receiving an on/off signal from a virtual or physical button. For example, the virtual button may be a user-interface button presented on the first touch display and/or the second touch display. The physical button may be a physical button communicatively coupled and/or physically connected to system 100.

In some embodiments, the first input mode may include detecting one or more first input elements displayed on at least one of the first touch display or the second touch display. For example, detecting one or more first input elements may include inspecting all input elements displayed on at least one of the first touch display or the second touch display and checking one or more properties of each input element to determine whether the input element is a first input element. In some embodiments, the one or more first input elements may comprise continuous input elements. Continuous input elements as discussed in the disclosed embodiments may include inputs and/or input fields that require continuous focus, such as those illustrated and discussed in FIG. 4A below. For example, inputs from a physical and/or virtual keyboard may require continuous focus on a particular text input field because changing the focus from the particular text input field to another user interface element will not feed succeeding inputs received from the physical and/or virtual keyboard into the particular text input field until focus is returned to the particular text input field. Additionally or alternatively, inputs such as hover signals and/or movement signals received from a pointing device may require continuous focus.

In some embodiments, the one or more first input elements may comprise text input fields configured to receive input from only a physical keyboard or a virtual keyboard. Additionally or alternatively, the one or more first input elements may comprise a virtual keyboard.

In some embodiments, the first input mode may further comprise generating one or more second input elements. For example, the one or more second input elements may comprise discrete input elements. Discrete input elements as discussed in the disclosed embodiments may include all inputs and/or input fields that do not require continuous focus. For example, discrete inputs may comprise selectable user interface buttons, such as those illustrated and discussed in FIGS. 4B and 4C below.

In some embodiments, the one or more second input elements may consist of one or more non-keyboard inputs and one or more input fields configured to present the one or more non-keyboard inputs. For example, non-keyboard inputs may comprise user interface buttons, such as those illustrated and discussed in FIGS. 4B and 4C below. In some embodiments, the one or more second input elements may not comprise one or more text input fields configured to receive input from only a physical keyboard or a virtual keyboard.

In some embodiments, the first input mode may further comprise replacing the one or more first input elements with the generated one or more second input elements for display on at least one of the first touch display or the second touch display. For example, the first input mode may be a POS mode wherein when POS mode is enabled, the one or more processors may be configured to cause the first touch display and the second touch display to replace continuous input elements with discrete input elements. In some embodiments, the one or more processors may replace continuous input fields (e.g., text input fields) presented on the first touch display and/or second touch display with discrete input fields (e.g., input field configured to display a value of the selected discrete input(s)).

At step 206, the one or more processors may be configured to receive a second input associated with at least one of the first touch display or the second touch display. For example, system 100 may receive a second input via a second user interface presented on the second touch display. In some embodiments, the second user interface may include various elements selectable via touch and/or via I/O devices (e.g., pointing device, keyboard). For example, system 100 may present on the second touch display one or more user interfaces to place orders, accept orders, edit orders, add notes, view ordered items for both in-store and online orders, apply discount amounts, etc. In some embodiments, the second input may comprise an input received from a physical keyboard communicatively coupled to system 100. In some embodiments, the second input may comprise a touch input received from a virtual keyboard. In some embodiments, the second input may comprise a touch input signal received in response to a user selecting a button included in the second user interface, wherein the button is a discrete input.

At step 208, the one or more processors may be configured to determine whether the first input mode is enabled. For example, in some embodiments, the one or more processors may check to determine whether a particular bit in a data structure indicating that the first input mode is enabled is set. As another example, in some embodiments, the one or more processors may check the operating system registry to determine whether the first input mode is enabled. In some embodiments, determining whether the first input mode is enabled may comprise using software, hardware, firmware, or a combination there of to determine the status of a first input mode.

At step 210, the one or more processors may be configured to, based on determining whether the first input mode is enabled, deny the second input. For example, based on determining that the first input mode is enabled, the one or more processors may ignore a second input, wherein the second input is an input received from the physical keyboard. Additionally or alternatively, based on determining that the first input mode is enabled, the one or more processors may ignore the second input, wherein the second input is an input received based on a touch signal generated in response to making a selection on a virtual keyboard.

In some embodiments, the one or more processors may be configured to, based on determining that the first input mode is enabled, accept the second input, wherein the second input is a discrete input. For example, based on determining that the first input mode is enabled, the one or more processors may be configured to accept a touch input selecting a button included in the second user interface, wherein the button is a discrete non-keyboard input.

In some embodiments, the one or more processors may be configured to, based on determining that the first input mode is not enabled, accept both continuous and discrete inputs via both the first touch display and the second touch display. In some embodiments, the one or more processors may be configured to, based on determining that the first input mode is not enabled, accept both continuous and discrete inputs via only one of the first touch display or the second touch display.

In some embodiments, the one or more processors may be configured to detect a trigger event. For example, detecting the trigger event may comprise determining that a predetermined time has passed since input was last received via the first user interface of the first touch display. In some embodiments, system 100 may further comprise one or more sensors, and detecting the trigger event may comprise detecting that no users are in front of the first touch display based on information received from the one or more sensors. For example, the one or more sensors may comprise one or more cameras configured to collect video stream data. In some embodiments, the one or more processors may be configured to use a pre-trained neural network (e.g., recurrent neural network, long short-term memory, artificial neural network, convolutional neural network) to detect one or more users using information received from the one or more sensors, and the one or more processors may be further configured to use the pre-trained neural network to detect that no users are in front of the first touch display.

In some embodiments, the one or more processors may be configured to, in response to detecting the trigger event, enable a second input mode. For example, enabling the second input mode may comprise disabling the first input mode. The one or more processors may be configured to enable the second input mode and disable the first input mode using similar techniques as discussed above with respect to enabling the first input mode.

In some embodiments, enabling the second input mode may comprise causing both the first touch display and the second touch display to accept one or more inputs via first input elements. Alternatively, enabling the second input mode may comprise causing only one of the first touch display and the second touch display to accept user input via first input elements. For example, enabling the second input mode may cause the second touch display to accept user input via first input elements. In some embodiments, in the second input mode, first input elements may have higher display priority than second input elements. For example, when the second input mode is enabled, the one or more processors may be configured to display first input elements (e.g., user interface illustrated in FIG. 4A) over second input elements (e.g., user interface illustrated in FIG. 4B) in situations where either could be displayed. In some embodiments, the second input mode may be enabled whenever the first input mode is disabled, and vice versa.

Figure 3A:
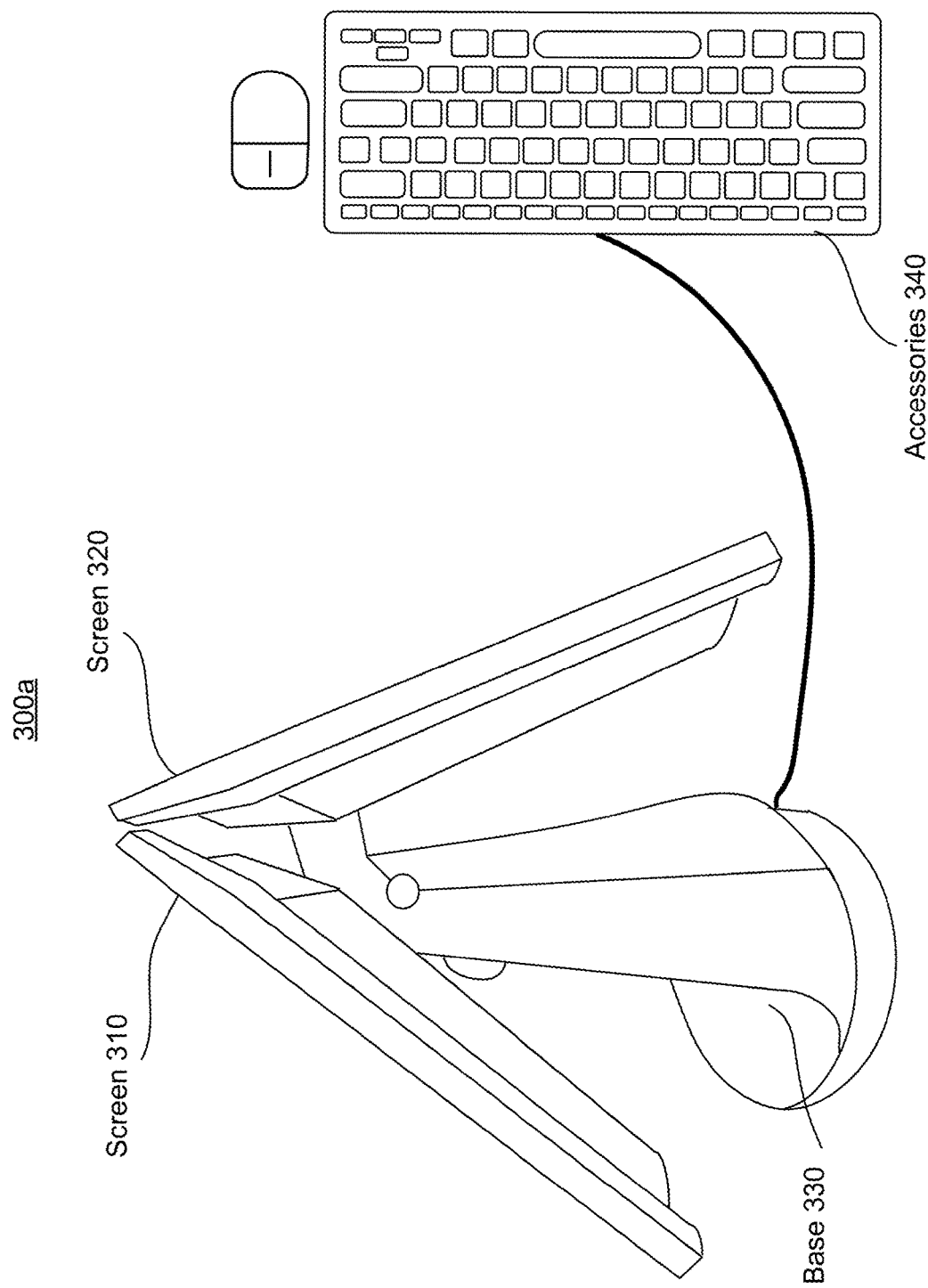
FIGS. 3A and 3B illustrate exemplary embodiments of a point-of-sale (POS) system, consistent with the disclosed embodiments.
Figure 3B:
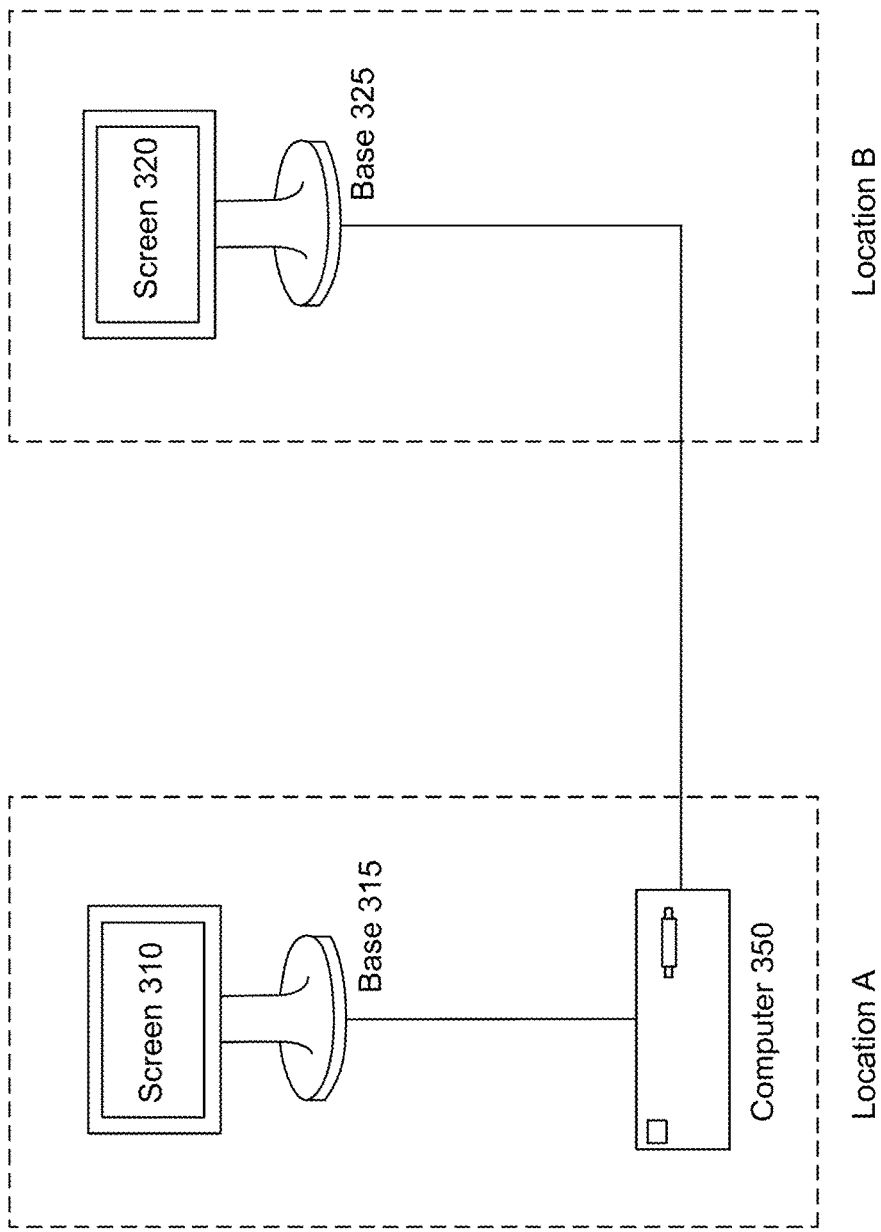

FIGS. 3A and 3B illustrate exemplary systems 300a and 300b, consistent with disclosed embodiments. In some embodiments, and as discussed throughout this disclosure, systems 300a and 300b are POS (point-of-sale) devices, but one of ordinary skill will understand that systems 300a and 300b have applications outside of a POS environment. System 300a may include screen 310, screen 320, base 330, one or more accessories 340, a computer (not pictured) or other components consistent with disclosed embodiments. System 300b may include screen 310, base 315, screen 320, base 325, computer 350 or other components consistent with disclosed embodiments. Screen 310 and screen 320 may be touch screens configured to receive touch input and/or input from one or more accessories 340. Bases 315, 325 and 330 may be supportive structures designed to hold up screens 310 and 320. In some embodiments, Systems 300a and 300b may be configured for wired communication (e.g., high speed internet cables, fiber optic cables, USB cable, or other cables) and wireless communication (e.g., cellular, LTE, LoRA (long range wireless) module, a GSM transceiver, a 3G transceiver, a 4G transceiver, a Wi-Fi router, or other equipment for wireless communication). In some embodiments, systems 300a and 300b include one or more cameras (not pictured). In some embodiments, a screen and computer may be comprised within a single device (e.g., tablet) configured to allow connection with other screens.

Components of a system may be distributed at various locations within a physical location as shown in system 300b of FIG. 3B. For example, screen 310, base 315 and computer 350 may be in location A of a retail store and screen 320 and base 325 may be in location B of the retail store and connected to the components in location A using a long cable. The configuration shown in FIG. 3B may be capable of separating a merchant-side of a store (e.g., Location A) from a customer-side of the store (e.g., Location B) while reducing computational resources.

Both configurations shown in FIGS. 3A and 3B may enable a single computer (e.g., computer 350) to efficiently and effectively generate user interfaces that allow for processing inputs received from separate touch screens being used by different users at the same time.

Figure 4A:
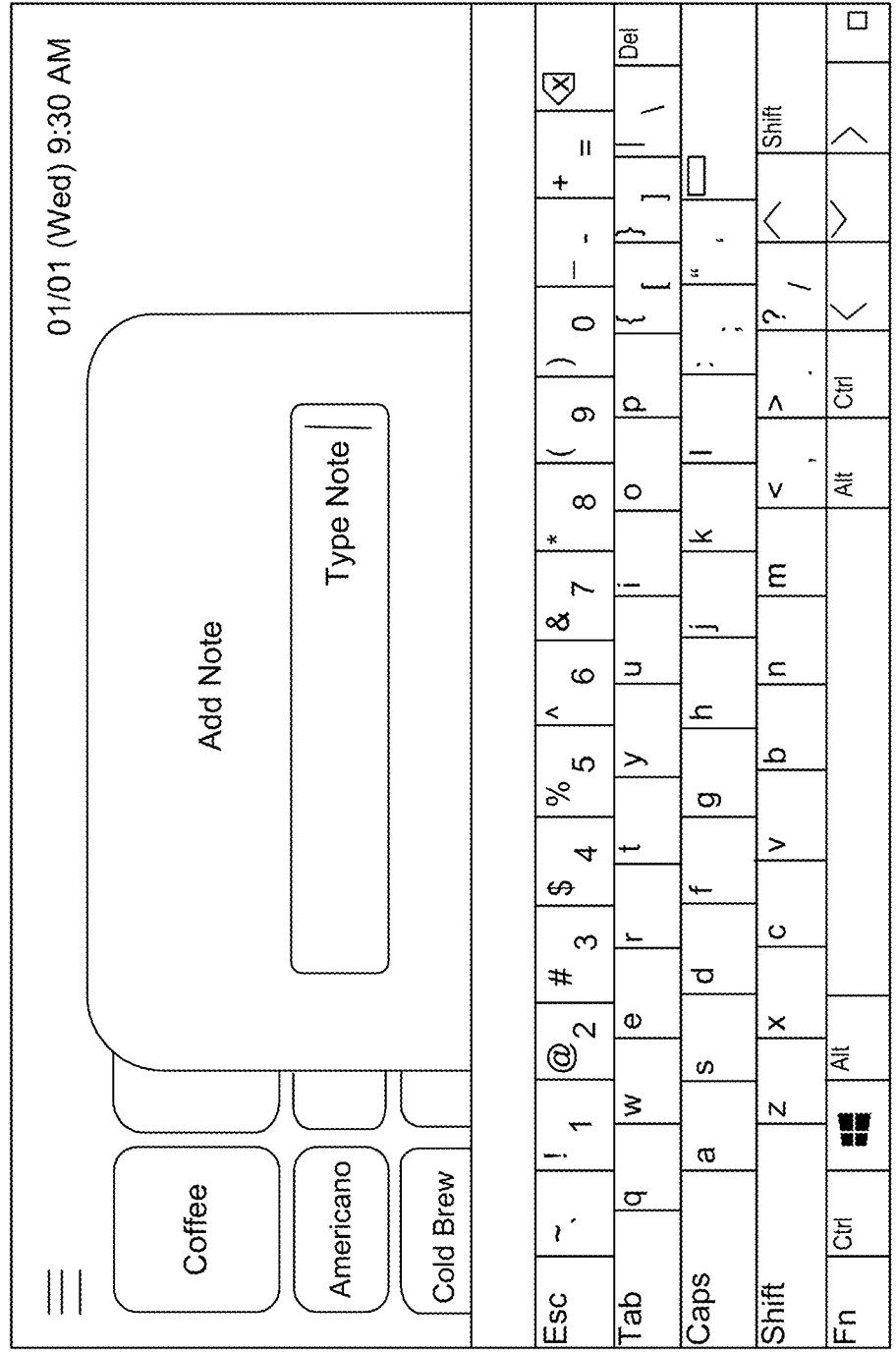
FIG. 4A depicts an exemplary user interface displayed in a non-POS mode, consistent with the disclosed embodiments.
Figure 4B:
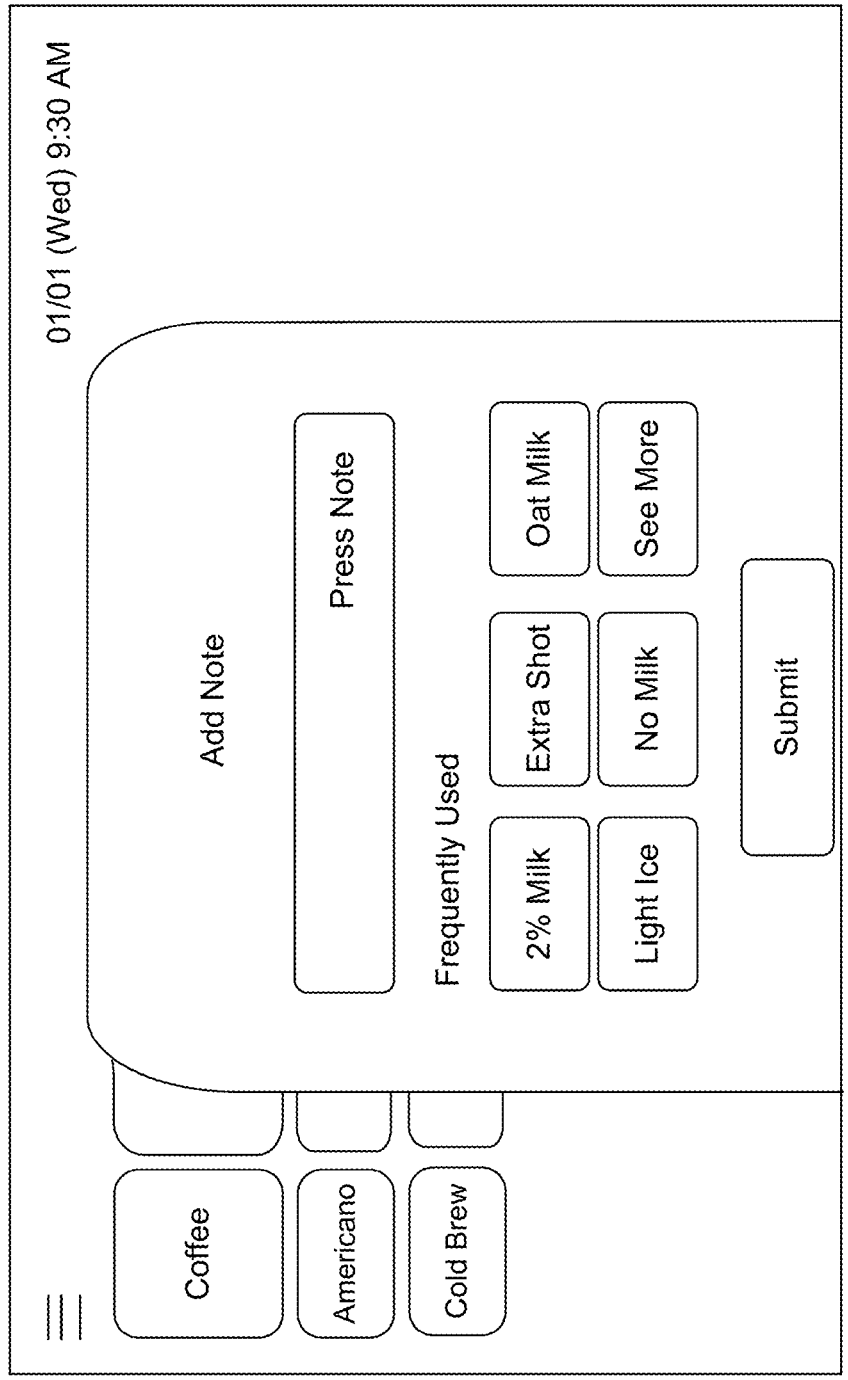
Figure 4C:
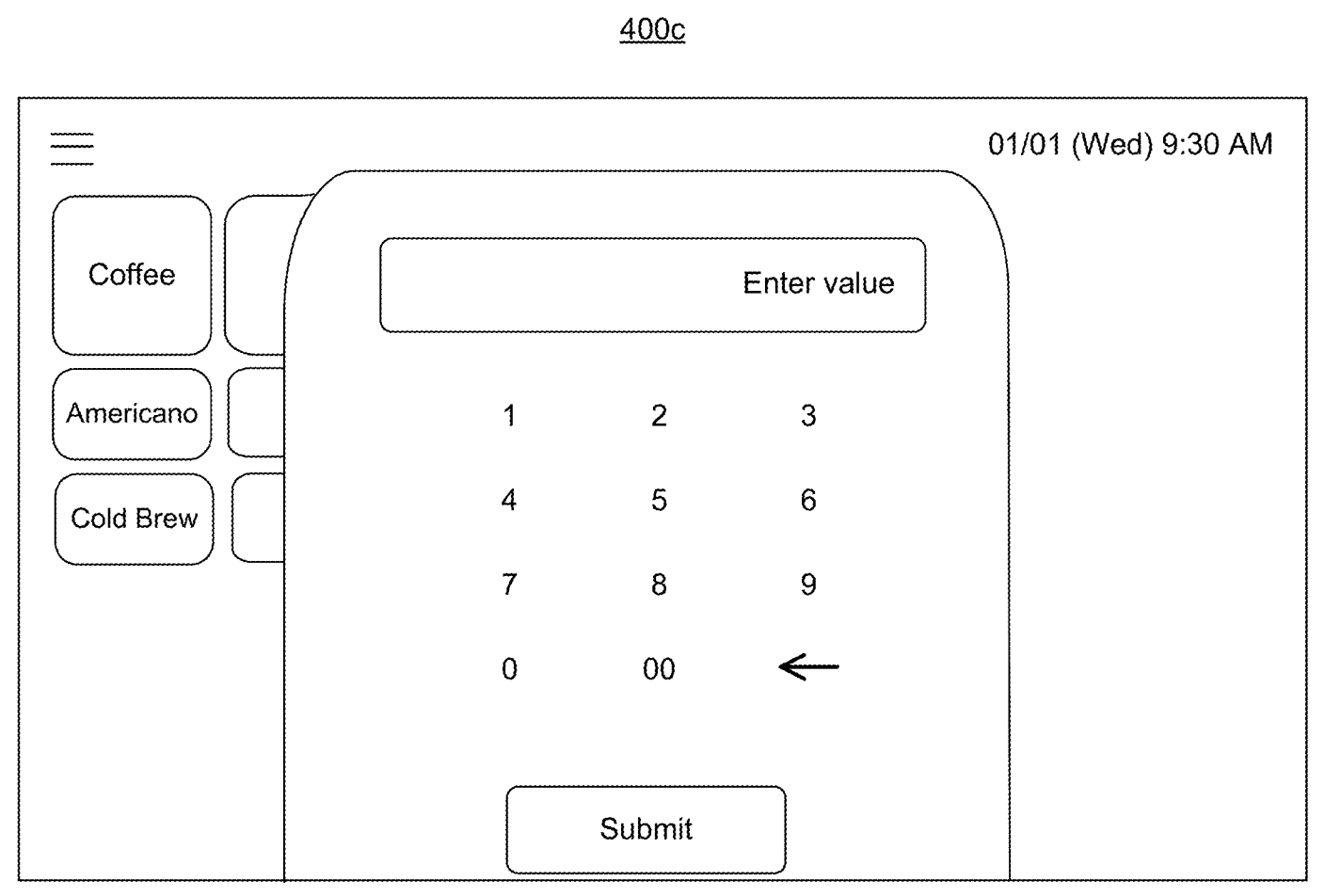

FIG. 4A-4C depict exemplary user interfaces that may be displayed on one or more touch screens of a system (e.g., systems 100, 300a, or 300b). For example, as shown in FIG. 4A, interface 400a may be an exemplary interface displayed on one or more touch screens (e.g., user interface device 110, user interface device 120, screen 310, screen 320) before a first input mode is enabled and/or after the first input mode is disabled (i.e., when a second input mode is enabled), as discussed above with respect to step 210 of FIG. 2. Interface 400a may comprise one or more continuous input elements as well as one or more discrete input elements, and may allow inputs to be received via a virtual keyboard, as illustrated, as well as a physical keyboard connected to the POS system. The received inputs may be fed into and displayed in a text input field (e.g., text box with "Type Note"). For example, interface 400a may be presented on a merchant-side touch screen.

As shown in FIG. 4B, once the first input mode is enabled (as discussed above with respect to, e.g., FIG. 4), the system may generate interface 400b and may replace interface 400a with interface 400b. For example, the system may identify and create a list of continuous input elements included in interface 400a. The system may further generate one or more discrete input elements and may replace the one or more continuous input elements of interface 400a such that interface 400b may comprise only discrete input elements. Interface 400b may allow discrete inputs such as touch, scroll, and drag inputs to be received via the touch screen and a pointing device connected to the system.

FIG. 4C illustrates another interface 400c that may be presented on a touch screen when the first input mode is enabled. For example, interface 400c may comprise discrete inputs in the form of selectable user interface buttons (e.g., 1, 2, 3, . . . 00, ←, "submit"). Interface 400c may further comprise one or more discrete input fields (e.g., box with "Enter value") configured to display one or more currently selected values. For example, if a touch input associated with the user interface button of "1" is first received, box with "Enter value" may be dynamically updated to display "1." If, subsequently, a touch input associated with the user interface button of "2" is received, box with "1" may be dynamically updated to display "12." If, subsequently, a touch input associated with the user interface button of "←" is received, box with "12" may be dynamically updated to display "1." While such input fields would normally be operated in a continuous manner (i.e., requiring focus on the field and accepting input via a software or hardware keyboard) and using, for example, operating system APIs and routines to receive input from such devices in a continuous manner, the input field in exemplary interface 400c would be implemented such that it would render inputs received through the selectable user interface buttons and render an input based on those inputs. For example, one or more processors may implement a stack data structure that accepts touch inputs of digits 0-9 as a "push" and touch inputs of the backspace ("←") key as a "pop" from the stack.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for dynamically controlling a multi-screen device, the system comprising:
   one or more memory devices storing instructions;
   a first touch display configured to receive one or more touch inputs;
   a second touch display configured to receive one or more touch inputs; and
   one or more processors, communicatively coupled to the first touch display and the second touch display, configured to execute the instructions to perform operations comprising:
      receiving a first input via the first touch display;
      in response to receiving the first input, enabling a first input mode, wherein enabling the first input mode causes the one or more processors to:
         detect one or more first input elements displayed on at least one of the first touch display or the second touch display, wherein the first input elements include a continuous input field that requires continuous focus to receive input, and wherein a click or touch interaction on the first touch display or the second touch display outside of the continuous input field causes focus to leave the continuous input field and automatically causes subsequent inputs to not be input to the continuous input field;
         generate one or more second input elements, wherein the second input elements include a discrete input field that does not require continuous focus to receive input, and wherein a click or touch interaction on the first touch display or the second touch display outside of the discrete input field does not automatically cause subsequent inputs to not be input to the discrete input field; and
         replace the one or more first input elements with the generated one or more second input elements for display on at least one of the first touch display or the second touch display;
      receiving a second input associated with at least one of the first touch display or the second touch display;
      determining whether the first input mode is enabled; and
      based on determining whether the first input mode is enabled, denying the second input.

2. The computer-implemented system of claim 1, wherein the first touch display comprises a customer-side touch display and the second touch display comprises a merchant-side touch display.

3. The computer-implemented system of claim 1, wherein the first touch display and the second touch display are physically connected.

4. The computer-implemented system of claim 1, the one or more processors configured to execute the instructions to perform operations further comprising:
   detecting a trigger event; and
   in response to detecting the trigger event, enabling a second input mode.

5. The computer-implemented system of claim 1, wherein the first input mode is a POS mode.

6. The computer-implemented system of claim 1, wherein the one or more first input elements comprise text input fields configured to receive input from only a physical keyboard or a virtual keyboard.

7. The computer-implemented system of claim 1, wherein the one or more second input elements consist of non-keyboard inputs and one or more input fields configured to present the one or more non-keyboard inputs.

8. The computer-implemented system of claim 4, further comprising one or more sensors, and wherein detecting the trigger event comprises detecting that no users are in front of the first touch display based on information received from the one or more sensors.

9. The computer-implemented system of claim 4, wherein detecting the trigger event comprises determining that a predetermined time has passed since input was last received via the first user interface of the first touch display.

10. The computer-implemented system of claim 1, wherein enabling the second input mode comprises disabling the first input mode and causing the second touch display to accept user input via text input fields configured to receive input from only a physical keyboard or a virtual keyboard.

11. A computer-implemented method for dynamically controlling a multi-screen device, comprising:
   receiving a first input via the first touch display;
   in response to receiving the first input, enabling a first input mode, wherein enabling the first input mode causes the one or more processors to:
      detect one or more first input elements displayed on at least one of the first touch display or the second touch display, wherein the first input elements include a continuous input field that requires continuous focus to receive input, and wherein a click or touch interaction on the first touch display or the second touch display outside of the continuous input field causes focus to leave the continuous input field and automatically causes subsequent inputs to not be input to the continuous input field;
      generate one or more second input elements, wherein the second input elements include a discrete input field that does not require continuous focus to receive input, and wherein a click or touch interaction on the first touch display or the second touch display outside of the discrete input field does not automatically cause subsequent inputs to not be input to the discrete input field; and
      replace the one or more first input elements with the generated one or more second input elements for display on at least one of the first touch display or the second touch display;
   receiving a second input associated with at least one of the first touch display or the second touch display;
   determining whether the first input mode is enabled; and
   based on determining whether the first input mode is enabled, denying the second input.

12. The computer-implemented method of claim 11, wherein the first touch display comprises a customer-side touch display and the second touch display comprises a merchant-side touch display.

13. The computer-implemented method of claim 11, further comprising:
   detecting a trigger event; and
   in response to detecting the trigger event, enabling a second input mode.

14. The computer-implemented method of claim 11, wherein the first input mode is a POS mode.

15. The computer-implemented method of claim 11, wherein the one or more first input elements comprise text input fields configured to receive input from only a physical keyboard or a virtual keyboard.

16. The computer-implemented method of claim 11, wherein the one or more second input elements consist of non-keyboard inputs and one or more input fields configured to present the one or more non-keyboard inputs.

17. The computer-implemented method of claim 13, wherein detecting the trigger event comprises detecting that no users are in front of the first touch display based on information received from one or more sensors.

18. The computer-implemented method of claim 13, wherein detecting the trigger event comprises determining that a predetermined time has passed since input was last received via the first user interface of the first touch display.

19. The computer-implemented method of claim 11, wherein enabling the second input mode comprises disabling the first input mode and causing the second touch display to accept user input via text input fields configured to receive input from only a physical keyboard or a virtual keyboard.

20. A computer-implemented system for dynamically controlling a multi-screen device, the system comprising:
   one or more memory devices storing instructions;
   a first touch display configured to receive one or more touch inputs;
   a second touch display configured to receive one or more touch inputs; and
   one or more processors, communicatively coupled to the first touch display and the second touch display, configured to execute the instructions to perform operations comprising:
      receiving a first input;
      in response to receiving the first input, enabling a first input mode by replacing one or more continuous input elements with one or more discrete input elements for display on at least one of the first touch display or the second touch display,
      wherein continuous input elements include a continuous input field that requires continuous focus to receive input, wherein a click or touch interaction on the first touch display or the second touch display outside of the continuous input field causes focus to leave the continuous input field and automatically causes subsequent inputs to not be input to the continuous input field, and
      wherein discrete input elements include a discrete input field that does not require continuous focus to receive input, wherein a click or touch interaction on the first touch display or the second touch display outside of the discrete input field does not automatically cause subsequent inputs to not be input to the discrete input field;
      receiving a second input associated with the second touch display;
      determining whether the first input mode is enabled;
      in response to determining that the first input mode is enabled, denying the second input;
      detecting a trigger event; and
      in response to detecting the trigger event, disabling the first input mode.

* * * * *